No. 784,899. Patented March 14, 1905.

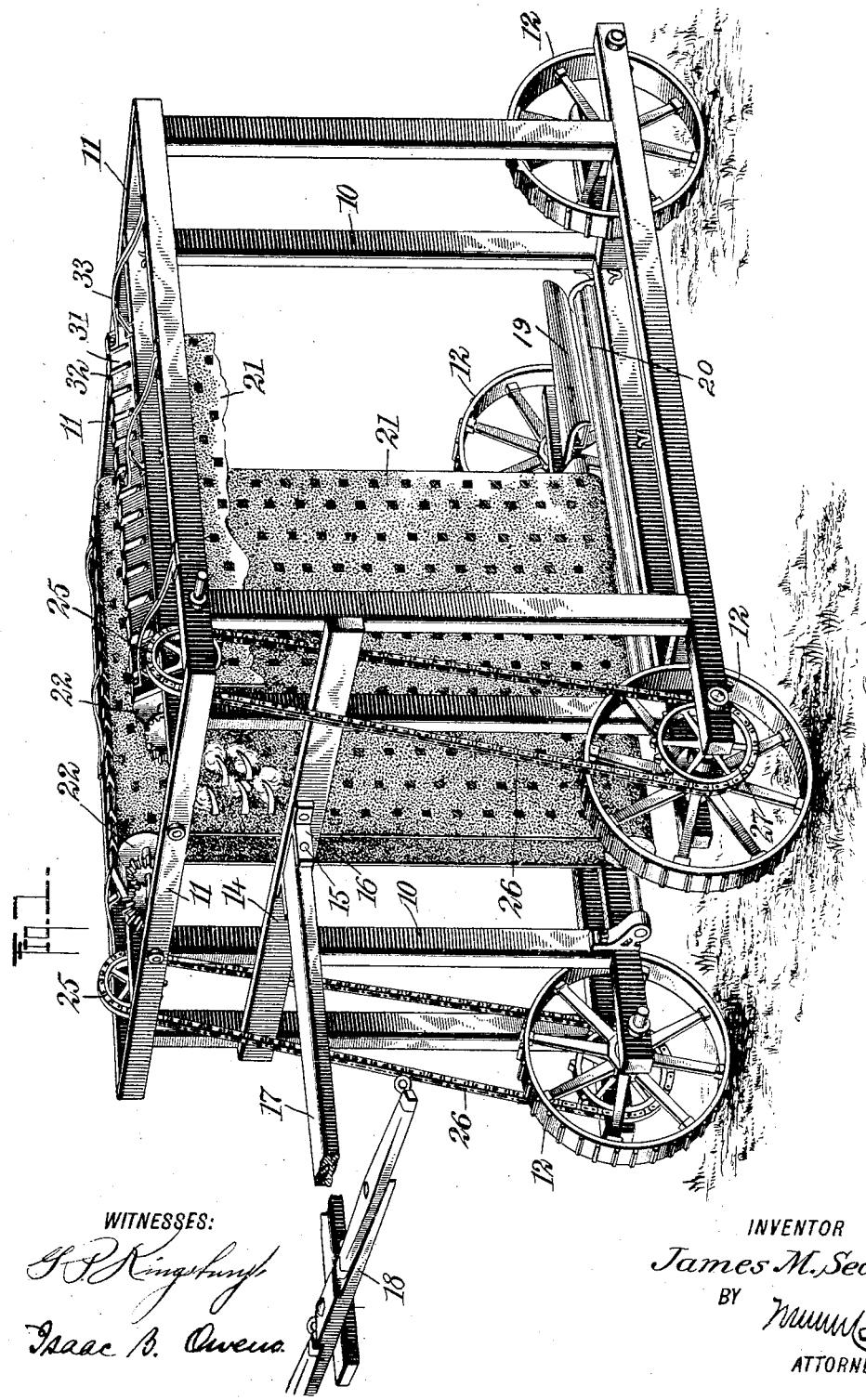

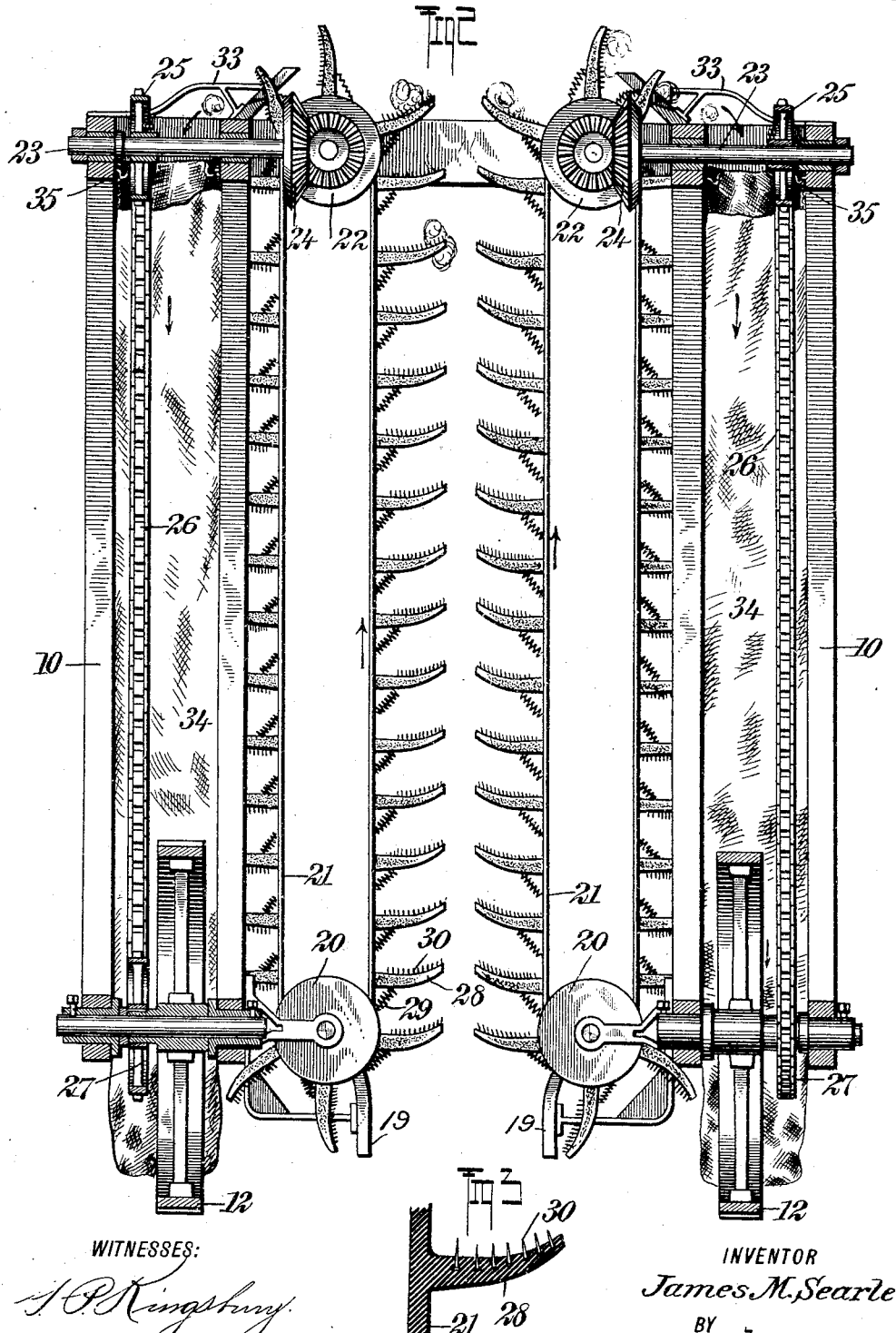

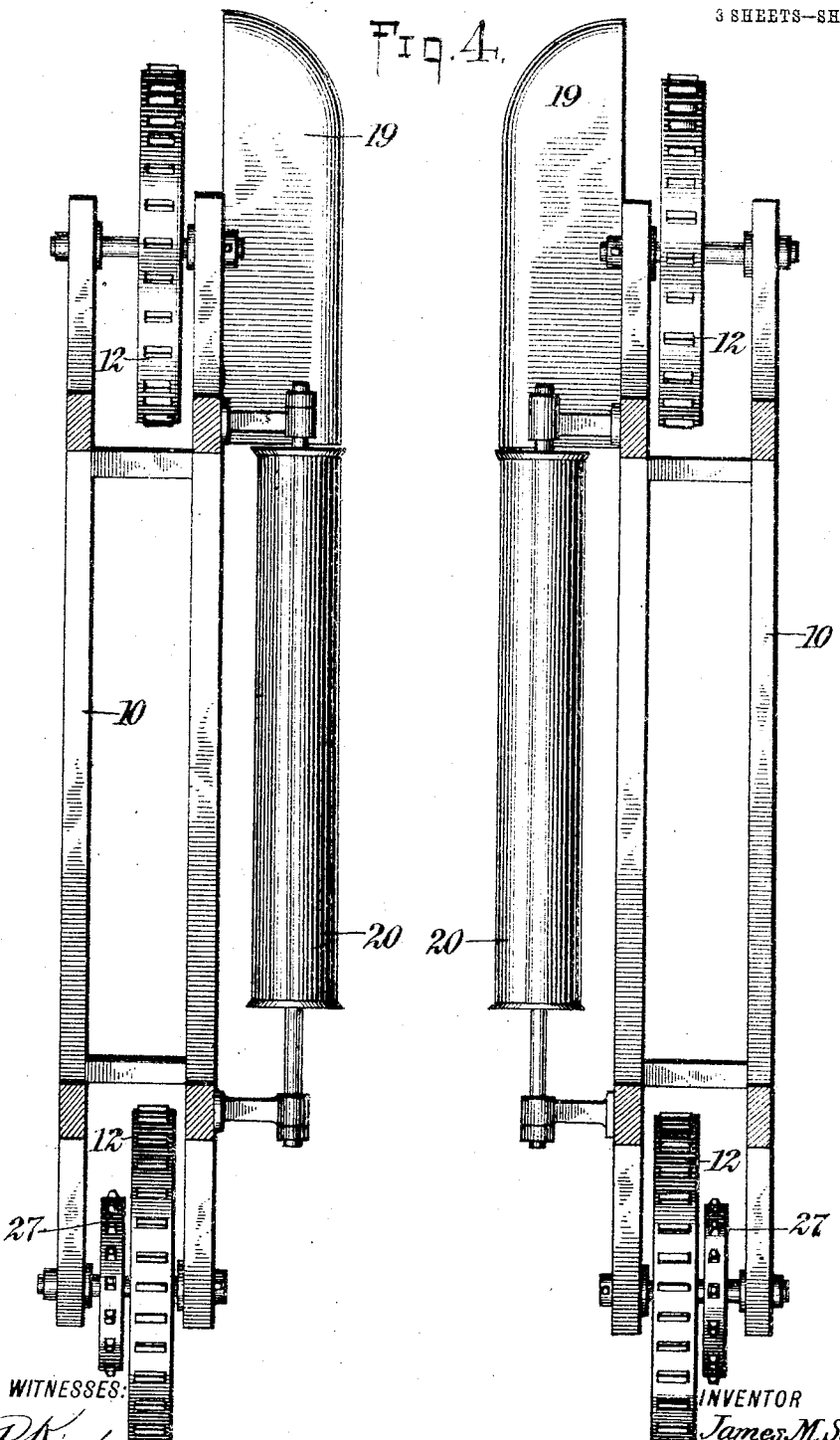

UNITED STATES PATENT OFFICE.

JAMES MANSKER SEARLES, OF VICKSBURG, MISSISSIPPI.

COTTON-PICKER.

SPECIFICATION forming part of Letters Patent No. 784,899, dated March 14, 1905.

Application filed October 28, 1904. Serial No. 230,386.

*To all whom it may concern:*

Be it known that I, JAMES MANSKER SEARLES, a citizen of the United States, and a resident of Vicksburg, in the county of Warren and State of Mississippi, have invented a new and Improved Cotton-Picker, of which the following is a full, clear, and exact description.

The invention relates to a machine adapted to move through the cotton-field and to remove the cotton from the plant, depositing the same in bags or receptacles carried by the machine.

The invention according to the practical embodiment thereof which I have chosen herein to describe comprises a wheeled frame adapted to straddle the cotton-rows and provided with traveling aprons, which pass at each side of the row, and peculiar picking-fingers by which the cotton is grasped and lifted to the upper part of the machine, where the cotton is disengaged from the pickers and falls into suitable receptacles provided for the cotton.

Reference is had to the accompanying drawings, illustrating, as an example, the preferred embodiment of my invention, in which drawings like characters of reference indicate like parts in the several views, and in which—

Figure 1 is a perspective view showing the machine with parts broken away. Fig. 2 is a sectional elevation of the machine. Fig. 3 is an enlarged detail view showing part of the apron and one of the picking-fingers thereof, and Fig. 4 is a sectional plan showing the lower part of the frame and the parts immediately adjacent thereto.

The framing of the apparatus comprises two side portions 10, connected at the top by front and rear cross-bars 11. The frame is mounted on wheels 12, two at each side, serving to support the machine and enable it to be readily drawn over the ground. At the rear of the frame it is provided with a cross-bar 14, to which is connected by a pin 15 and bracket 16 a tongue 17, having at its outer end whiffletrees 18 for the attachment of the team. The draft of the team is communicated through the pole to the machine, and the horses walk behind the machine and push it ahead of them.

The machine is provided at the front and at the inner side of each side part 10 of the frame with guard-boards 19, which are convexed on their outer ends, as shown in Fig. 4, and which serve to draw together the plants in the row and lift the fallen branches, so as to deposit the plants properly for the action of the picking devices which will be hereinafter described.

Suitably mounted at the inner part of the machine and at the inner side of each side part 10 of the frame is a corrugated roller 20. These rollers extend longitudinally of the machine and have the aprons 21 run over them. Said aprons extend upward and are passed around rollers 22, mounted at the top of the machine immediately above the rollers 20.

The belts are driven in the direction indicated by the arrows in Fig. 2 by means of shafts 23, connected by gears 24 to the upper rollers 22. These shafts are in turn driven through sprocket-wheels 25, connected by chains 26 with sprocket-wheels 27 on the axles of the rear wheels 12.

28 indicates the picking-fingers, which project from the outer surface of the belts 21. The belts 21 and fingers 28, as illustrated in Fig. 3, are preferably formed integral of rubber or equivalent flexible resilient material. As shown best in Fig. 2, the picking-fingers are reinforced by springs 29, which bear under the fingers and cause the belts to yieldingly hold the fingers extended, as shown. The fingers 28 are provided with bristles or spurs 30, projecting from their upper surfaces and adapted to engage the cotton. As the machine passes over the row of plants the picking-fingers drag through the plants and attach the spurs or bristles 30 to the cotton, so as to remove the cotton from the plant and carry the cotton upward to the top of the machine. At each side of the top of the machine are located devices for removing the cotton from the picking-fingers. These comprise scraper-plates 31, having slots 32 formed therein. Through these slots the fingers are designed to move, and the scraper-plates bearing against the fingers remove the cotton, as indicated in Fig. 2. Said plates 31 are suitably fastened in position, for instance, by means of brackets 33. As the cotton falls from the scraper-plates it enters bags or equivalent receptacles 34.

These are held in the side portions 10 of the frame by means of hooks or equivalent fasteners 35. The bags may be of any depth desired. As here shown they extend downward through the side portions of the frame to a point near the ground.

In the practical embodiment of the apparatus the parts are assembled as described and the machine pushed through the field, straddling one after the other the rows of cotton. The cotton is gathered by the fingers and raised to the top of the machine, where it is disengaged by the scraper devices and falls into the bags. When the bags are full, they may be removed from the machine and other bags placed in position, or the cotton may be emptied from the bags and the same bags instantly returned to the machine, if desired.

By having the rollers 20 corrugated the material of the aprons takes slightly into the corrugations, and the aprons are thereby prevented from slipping.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. A cotton-picker having an apron, means for movably mounting and driving the same, and a picking-finger integral with and projecting directly from the apron.

2. A cotton-picker having an apron, means for movably mounting and driving the same, and a resilient picking-finger integral with and projecting directly from the apron.

3. A cotton-picker having an apron, means for movably mounting and driving the same, a picking-finger integral with and projecting directly from the apron, and spurs projecting from the finger.

4. A cotton-picker having an apron, means for movably mounting and driving the same, an integral resilient picking-finger projecting directly from the apron, and spurs projecting from the picking-finger.

5. A cotton-picker having an apron, picking-fingers projected therefrom and formed integral therewith, and means for mounting and driving the apron.

6. A cotton-picker having an apron, picking-fingers projecting therefrom, the apron and fingers being formed integral of resilient rubber, and means for mounting and driving the apron.

7. A cotton-picker having an apron, picking-fingers projected therefrom and formed integral therewith, means for mounting and driving the apron, and spurs projecting from the picking-fingers.

8. A cotton-picker having an apron, picking-fingers projecting therefrom, the apron and fingers being formed integral of resilient rubber, means for mounting and driving the apron, and spurs projecting from the picking-fingers.

9. A cotton-picker having integrally-connected picking-fingers, means for mounting and driving the same, and a relatively stationary scraper adapted to be engaged by the fingers to remove the cotton from the fingers.

In testimony whereof I have signed my name to this specification in the presence of two subscribing witnesses.

JAMES MANSKER SEARLES.

Witnesses:
J. D. LAUGHLIN,
R. V. BOOTH.